(12) United States Patent
Varfolomeev (10) Patent No.: US 9,638,352 B2
(45) Date of Patent: May 2, 2017

(54) METHOD OF LAYING A PIPELINE

(71) Applicant: TECHNIP FRANCE, Courbevoie (FR)

(72) Inventor: Alexey Varfolomeev, Sandvika (NO)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 14/402,916

(22) PCT Filed: Apr. 15, 2013

(86) PCT No.: PCT/IB2013/000909
§ 371 (c)(1),
(2) Date: Nov. 21, 2014

(87) PCT Pub. No.: WO2013/175280
PCT Pub. Date: Nov. 28, 2013

(65) Prior Publication Data
US 2015/0104258 A1    Apr. 16, 2015

(30) Foreign Application Priority Data

May 24, 2012  (EP) .................................... 12169362

(51) Int. Cl.
*F16L 1/12* (2006.01)
*F16L 1/235* (2006.01)
(Continued)

(52) U.S. Cl.
CPC .............. *F16L 1/235* (2013.01); *B63B 35/03* (2013.01); *F16L 1/166* (2013.01); *F16L 1/203* (2013.01); *F16L 1/23* (2013.01)

(58) Field of Classification Search
USPC ............ 405/158, 166, 168.3, 173; 166/242.6
See application file for complete search history.

(56) References Cited

U.S. PATENT DOCUMENTS

| | | | | |
|---|---|---|---|---|
| 4,012,155 A | * | 3/1977 | Morris | ................ F16B 7/0413 24/625 |
| 5,590,915 A | * | 1/1997 | Recalde | ................ B65H 55/00 285/119 |

(Continued)

FOREIGN PATENT DOCUMENTS

| | | |
|---|---|---|
| GB | 2 476 823 | 7/2011 |
| GB | 2 477 780 | 8/2011 |
| WO | WO 93/08422 A1 | 4/1993 |

OTHER PUBLICATIONS

International Preliminary Report on Patentability (Chapter 1 of the Patent Cooperation Treaty) and Written Opinion of the International Search Authority dated Nov. 25, 2014 in corresponding International Application No. PCT/IB2013/000909 (7 pages).

(Continued)

*Primary Examiner* — Sean Andrish
(74) *Attorney, Agent, or Firm* — Ostrolenk Faber LLP (57) ABSTRACT

A method of laying a subsea pipeline from a reel, the pipeline having an in-line first locking member, the method having at least the steps of: (a) laying the pipeline under the water from the reel; (b) cutting the pipeline above the first locking member; (c) coupling the first locking member with a complementary second locking member; and (d) lowering the first and second locking members under the water. In this way, the pipeline already has located within it a suitable locking member for the abandoning operation, avoiding the need for a separate off-shore welding operation.

5 Claims, 4 Drawing Sheets

(51) Int. Cl.
*F16L 1/16* (2006.01)
*F16L 1/20* (2006.01)
*B63B 35/03* (2006.01)
*F16L 1/23* (2006.01)

(56) References Cited

U.S. PATENT DOCUMENTS

| | | |
|---|---|---|
| 2010/0226723 A1* | 9/2010 | Chouest .................. B63B 27/24 405/158 |
| 2011/0013988 A1 | 1/2011 | Wilson |
| 2011/0013998 A1 | 1/2011 | Tardivo |
| 2011/0142543 A1 | 6/2011 | Griffin |

OTHER PUBLICATIONS

Extended European Search Report and Search Opinion dated Nov. 12, 2012 in corresponding European Patent Application No. 12169362.6 (6 pages).
International Search Report dated Mar. 11, 2014 issued in corresponding International patent application No. PCT/IB2013/000909.

* cited by examiner

METHOD OF LAYING A PIPELINE

CROSS REFERENCE TO RELATED APPLICATIONS

The present application is a 35 U.S.C. §371 National Phase conversion of PCT/IB2013/000909, filed Apr. 15, 2013, claiming the benefit of European Application no. 12169362.6, filed May 24, 2012, the disclosure of which is incorporated herein by reference. The PCT International Application was published in the English language.

TECHNICAL FIELD OF THE INVENTION

The present invention relates to a method of laying a subsea pipeline from a reel, a method of providing and laying such a subsea pipeline, a reelable pipeline, and a reelable pipeline system, particularly but not exclusively for abandoning a pipeline.

BACKGROUND OF THE INVENTION

Subsea pipelines are well-known in the art for transporting fluids such as hydrocarbons such as oil and gas. Often, such pipelines are laid completely on a seabed or seafloor for the passage of fluids between two sites, such as a production well or wellhead and an adjacent production platform.

Such subsea pipelines are general laid from a pipe-laying vessel. Where the pipeline has sufficient flexibility, it can be formed 'onshore', and located on a large storage drum or reel on the pipe-laying vessel for subsequent laying off-shore directly from the reel. This is generally termed in the art 'reel-laying', and such pipelines which can be located on a reel are termed hereinafter "reelable pipelines". This is in contrast to the pipeline being formed off-shore section-by-section only during the laying process, generally termed stove-piping.

The reel-laying method is usually faster and more economical than the stove piping method, such that it is preferred where possible. However, the reeling process bends the pipeline creating various stresses, especially for 'rigid pipes', being single-walled or double-walled. Such pipelines are usually therefore 'straightened' after coming from the reel and prior to being laid. Straightening operations or processes generally involve one or more 'straighteners' known in the art.

The pipeline can be reeled onto a reel for subsequent location of the loaded reel onto a pipe-laying vessel, or reeled directly onto a reel already located on a pipe-laying vessel.

Typically during reel-laying, the pipeline is reeled from the reel on the pipe-laying vessel for its laying underwater, creating a first end (being the distal end) of the pipeline being laid. Once the desired length of pipeline has been provided from the vessel, that end of the pipeline still on or near the pipe-laying vessel, generally being the proximal end, then requires to be laid underwater, such as on the sea floor or sea bed. The laying of the proximal end is sometimes termed "abandoning" the pipeline.

Conventionally, the abandonment is provided by welding a suitable attachment onto the cut proximal end of the pipeline, which can then be attached to the wire of an abandonment and recovery ("A & R") winch for lowering into the water. Generally for this, the pipeline is clamped in its pipe-laying delivery system, and then cut above the clamp. An "abandoning head" is then welded to the end of the pipeline for attachment to an A & R wire.

However, this requires the welding of the abandonment head to be carried out during the critical laying process. This creates delay, which is undesired in monetary terms. It also has to be carried out in off-shore conditions. The welding must be sufficiently strong to take all of the weight of the pipeline extending from the pipe-laying vessel down to the sea floor or sea bed, and any flaw or weakness in the welding can lead to catastrophic failure in the abandonment of the pipeline. Detailed testing of the abandonment head attachment is difficult to achieve in the timing and situation of an ongoing pipe-laying operation.

US2001/0142543 A1 describes a method and system of laying a pipe for abandonment (using a sacrificial pipe string to extend the length of an A & R winch wire). In paragraph [0028], it confirms that an A & R head is installed on the distal end of the sacrificial pipe by welding, as is conventional in the art.

It is an object of the present invention to provide a simpler and more secure method, pipeline and system for laying a pipeline, especially for abandoning a pipeline.

SUMMARY OF THE INVENTION

Thus, according to one aspect of the present invention, there is provided a method of laying a subsea pipeline from a reel, the pipeline comprising an in-line first locking member, the method at least the steps of:
  (a) laying the pipeline under the water from the reel;
  (b) cutting the pipeline above the first locking member;
  (c) coupling the first locking member with a complementary second locking member; and
  (d) lowering the first and second locking members under the water.

In this way, the pipeline already has located within it a suitable locking member for this part of the laying, i.e. the abandoning operation, avoiding the need for a separate off-shore welding operation.

The subsea pipeline of the invention to be reeled and subsequently laid can be and is preferably a rigid pipeline for the passage, conveying, flow, transportation or otherwise movement of a fluid, generally being a hydrocarbon such as oil and gas, but not limited thereto. Such pipelines are well known in the art. Flowline and riser pipelines are considered 'rigid' when they are generally made from single wall metallic pipes, or from double walled metallic pipes (also called a 'pipe-in-pipes'). They can be laid at sea using the reel-laying process or technique, based on spooling or winding the 'rigid pipeline,' onto a reel by plastically bending it and then unreeling it and straightening it through straighteners located on the laying vessel prior to laying the pipeline in the sea.

The subsea pipeline of the invention may have any suitable length and dimensions, in particular outer circumference, depending upon the nature and use of the pipeline. The skilled man is aware of various hydrocarbon flowline pipelines, having various outer circumferences and lengths. Pipeline lengths can be up to 1 km long, or more than 1 km long, such as up to 2 km or up to 3 km etc.

The reel may have or may be able to accommodate one or more pipelines. That is, especially for shallower water, multiple pipelines, being the same or different, may be conjoined and then reeled onto one reel, for a number of subsequent separate laying operations.

The first locking member may have any suitable shape, size or design which allows coupling with a complementary second locking member. Typically, such first and second locking members are particularly adapted, such as having complementary male and female shapes, to provide secure coupling thereinbetween.

Optionally, the coupling of the first locking member and second locking member may involve a first engagement of the members, optionally being a single or multiple engagement steps or actions.

Optionally, the coupling of the first locking member and second locking member involves one or more subsequent securing steps or actions to help further couple or secure the first and second locking members together.

One example of a first locking member is a pawn head. Pawn heads generally comprise a body portion having a first outer dimension, and generally having a circular or substantially circular circumference, a thinning or tapering neck portion, followed by an enlarged head portion, optionally having the same as or smaller outer circumference as the body portion.

A complementary second locking member to such a first locking member being pawn head may comprise an outer shell having a relatively thin section, to be complementary to the enlarged head section of the pawn head, and a thicker walled section, to be complementary to the thinning or tapering neck portion.

Optionally, the complementary second locking member is formed in two or more portions, parts, sections or units, to be brought together and subsequently secured together around the first locking member. For example, the second complementary locking member comprises two half shells, with a direct or indirect (e.g. via a shackle or other connector) wire attachment. The two half shells may be the same or different, generally comprising mirror internal shaping able to mate around one half of the first locking member, to create a wholly or substantial body around the first locking member.

The second locking member may also include one or more additional securing pieces or devices, such as a locking sleeve, to assist locking with and/or securement to the first locking member.

Another example of a first locking member is a plate or a pad eye, optionally comprising a body portion and/or a head portion, with one or more apertures therethrough. A complementary second locking member to such a first locking member could be any connector, such as a shackle (and pin or bolt) but not limited thereto, able to connect in a complementary manner with at least one such aperture, to provide a suitable subsequent attachment to a wire or the like.

The coupling of the first and second locking members is not limited by the locking members having directly complementary shapes or designs.

The skilled reader will appreciate that all aspects, features and embodiments described for the complementary second locking member may be equally provided as the first locking member: and that all aspects, features and embodiments described for the first locking member may be equally applied to be the complementary second locking member. The present invention is not limited by the dominance of one locking member over the other locking member, and is possible by the interchangeability of the nature of the first and second locking members to still achieve the purpose of the present invention.

The pipeline itself may comprise one or more sections, optionally one or more differing sections, along its length. Generally, the pipeline will comprise at least a or one "main" pipeline section intended to be the main body of the pipeline underwater, and having the or each flowline or flowpath for the transportation, etc. of a fluid therethrough.

The main pipeline section may comprise a plurality of the same or similar pipe lengths, such as pipe strings, welded together, generally on-shore. Generally, such main pipeline sections are formed from one or more pipeline lengths or strings, typically being 12 m or 24 m long, welded together to form an overall pipeline for use underwater, generally subsea, and generally for use between two or more units or devices located on or next to the sea floor.

Optionally, the pipeline also comprises a transition section, being that part of the pipeline intended to be still connected or otherwise located on or around the reel, especially after the cutting of the pipeline above the first locking member.

In one embodiment, the transition section is a head or lead section, sometimes termed a "lead string" adapted to be located at one end of the pipeline. The lead string section provides the first part of a pipeline to be reeled, and the last part of the pipeline to be unreeled. Optionally, it is the lead string section which remains on the pipe-laying vessel whilst the main section of the pipeline is abandoned.

In another embodiment, the transition section is an intermediate section, adapted to be intermediate a main section described hereinabove and another pipe or pipeline on the reel, which remains on the pipe-laying vessel whilst the main section of the first pipeline is abandoned.

Optionally, the pipeline comprises a combination of one or more main sections and one or more transition sections; optionally one or more differing main sections and/or one or more differing transition sections, along its length. For example, the reel may have thereon a number of pipelines spooled thereon, for separate laying operations. Each pipeline can be conjoined with a transition section, to provide a single reelable pipeline for a single reeling operation as is known in the art.

One or more transition section(s), especially a lead string, may be the same as or similar to a portion of the main section, such as one or more pipe lengths as described above, optionally simpler in form and nature as its use is intended only as a transition section.

Additionally or alternatively, one or more transition section(s) may be different to a portion of a main section, such as being able to transition between different main sections.

The skilled user is aware of the nature and design of main pipeline sections and transition sections, such that these sections are not discussed in further detail.

According to one embodiment of the present invention, the pipeline comprises a main pipeline section and a transition section, and wherein the first locking member is attached to the end of the main pipeline section prior to the transition section.

In one embodiment, the first locking member is welded to a main pipeline section of the pipeline, optionally with additional securement. A transition section can then be attached to this combination, by any suitable form of attachment such as welding, clamping, bolting, etc. and combinations of same, to form the pipeline ready to be reeled.

The pipeline may be cut above the first locking member using any suitable form of cutting which allows access to the first locking member for the second locking member. The term "cutting" can include unconnecting or uncoupling, and such forms of cutting are not limited to cleaving, dividing or severing the pipeline. Such forms include all types of parting, unclamping, unbolting, uncoupling, etc. and combinations of same.

Once the first and second locking members are coupled, the attached pipeline, generally being the proximal end of the main section of pipeline, can be lowered under water. Generally, this is to lower all of the pipeline onto the sea bed or sea floor.

The lowering can be carried out using any suitable process, means or equipment. Optionally, step (d) of the method of the present invention as described above comprises:
- attaching an A&R (Abandonment and Recovery) wire to at least one of the first and second locking members, and
- extending the A&R wire to lower the first and second members under the water.

Such attachment may be via any suitable connector or connection, such as a shackle and pin or bolt arrangement, where not already provided as the second locking member. Lowering an A & R wire and an attached pipeline is known in the art, and is not further described herein.

In a further aspect of the present invention, there is provided a method of providing a subsea pipeline ready for reel-laying at least comprising the steps of:
  (i) locating a first locking member in-line in the pipeline;
  (ii) reeling the pipeline onto a reel;
  (iii) locating the reel onboard a reel-laying vessel.

Steps (ii) and (iii) can be carried out in either order, i.e. either the pipeline is spooled onto a reel located onshore and subsequently relocated onboard of a reel-laying vessel, or the pipeline is spooled onto a reel already located on board a reel-laying vessel.

Preferably, step (i) is carried out onshore. The attachment of a first locking member in the line of a pipeline is a relatively simple action that can be carried out on-shore with a high level of assurance in the attachment process, in particular, without considering or having to take account of offshore conditions. This is particularly for attachment by welding. In this way, the pipe-layer can have much greater assurance and confidence in the strength of the attachment of the first locking member within the pipeline, and the first locking member is 'ready for use' when required off-shore, particularly during the laying process, saving time and energy.

In a further aspect of the present invention, there is provided a method of providing and laying a subsea pipeline at least comprising the steps of:
  (i) locating a first locking member in-line in the pipeline;
  (ii) reeling the pipeline onto a reel;
  (iii) locating the reel onboard a reel-laying vessel (or vice-versa with step (ii));
  (iv) laying the pipeline under the water from the reel;
  (v) cutting the pipeline above the first locking member;
  (vi) coupling the first locking member with a complementary second locking member; and
  (vii) lowering the first and second locking members under the water.

According to another aspect of the present invention, there is provided a reelable pipeline for laying under water, comprising an in-line first locking member.

Preferably, the reelable pipeline is for use with one or both of the methods described herein.

The first locking member of the reelable pipeline is described hereinabove. Optionally, the first locking member is a male locking member of a male-female lock, but the present invention is not limited thereto and the first locking member may also be the female part of a male-female lock. Preferably, the male locking member is a pawn head.

The reelable pipeline may be as described herein, generally comprising known forms of pipeline in the art, which are not described in any further detail, and being reelable on to a reel, generally of a pipe-laying vessel.

As described above, in one embodiment of the present invention, the pipeline comprises a main pipeline section and a transition section, and wherein the first locking member is attached to the end of the main pipeline section prior to the transition section.

Preferably, the transition section has the same or similar diameter as the main pipeline section.

The term "in-line" as used herein includes any relationship of the first locking member with the pipeline, the locking member being part of the pipeline. Thus, the pipeline with its "in line" locking member can be spooled or wound around the reel without modifying the reeling process. In particular, the in-line locking member can be reeled onto the reel continuously like the remainder of the pipeline. Generally, the first locking member is arranged to be in alignment with the pipeline. This includes but is not limited to having a longitudinal axis being the same as the longitudinal axis of the pipeline, or optionally having a longitudinal axis being parallel with the longitudinal axis of the pipeline, but within the circumference of the pipeline. The term "in-line" as used herein includes the first locking member having a shape, size or design which is the same as, greater than, or less than, or a variation of same, the diameter or outer circumference of the pipeline to which it is attached.

Preferably, the first locking member has an outer circumference which is the same as or less than the outer circumference of the pipeline to which it is attached.

More preferably, the first locking member comprises an outer body sectional portion, and the outer body sectional portion has the same outer circumference as the pipeline to which it is attached, preferably the same as a main pipeline section of a pipeline comprising at least a main pipeline section and a transition section.

More preferably, the pipeline comprises a main pipeline section and a transition section, and both sections and the first locking member have the same outer circumference. This provides a continuous smooth outer circumference along the pipeline extending from the main pipeline section, across the first locking member and into the transition section.

The first locking member is preferably able to be coupled with a complementary second locking member. Second locking members, and the nature or form of coupling, are described hereinabove.

As mentioned hereinabove in relation to the methods of the present invention, all aspects, features and embodiments described for the complementary second locking member may be equally provided as the first locking member in the reelable pipeline of the present invention: and all aspects, features and embodiments described for the first locking member may be equally applied to be a complementary second locking member. The reelable pipeline of the present invention is not limited by the dominance of one locking member over the other locking member, and is possible by the interchangeability of the nature of the first and second locking members to still achieve the purpose of the present invention.

According to a further aspect of the present invention, there is provided a reelable pipeline system comprising a reelable pipeline as defined hereinabove, and a complementary second locking member.

The nature, size, design and shape of the complementary second locking member is described above, and includes the complementary second locking member being the male or female part of male-female lock.

Preferably, the complementary second locking member of the reelable pipeline system comprises two half shells and a wire attachment. The two half shells may be the same or different, generally comprising mirror internal shaping able to mate around one half of the first locking member, and which together create a wholly or substantial body around the first locking member. Optionally, one or further securements or locking actions assist securing the two half shells together as part of, prior to or subsequent to any attachment of a wire thereto.

The present invention involves a number of methods and at least a reelable pipeline and reelable pipeline system, and the skilled man is aware that aspects or embodiments described in relation to one or more aspects of the present invention can be applied to one or more other aspects of the present invention, such that a description herein of certain embodiments can be applied to others of the methods and the pipelines described.

BRIEF DESCRIPTION OF THE DRAWINGS

Embodiments of the present invention will now be described by way of example only and with reference to the accompanying drawings in which.

DESCRIPTION OF PREFERRED EMBODIMENTS

Figure 1:
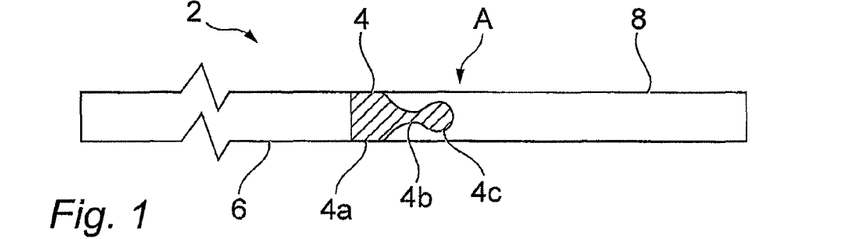
FIG. 1 is a side schematic view of a first reelable pipeline according to one embodiment of the present invention, and for use with a method of the present invention.

Referring to the drawings, FIG. 1 shows a reelable pipeline 2 for laying under water, comprising an in-line first locking member 4 according to one embodiment of the present invention. The pipeline 2 comprises a main pipeline section 6 and a transition section 8, wherein the first locking member 4 is attached to the end of the main pipeline section 6 prior to the transition section 8.

The first locking member 4 of the pipeline 2 shown in FIG. 1 is preferably a male locking member of a male-female lock. More preferably, the first locking member 4 is a pawn head, or can otherwise be described as having a pawn head shape.

Figures 8, 9A:
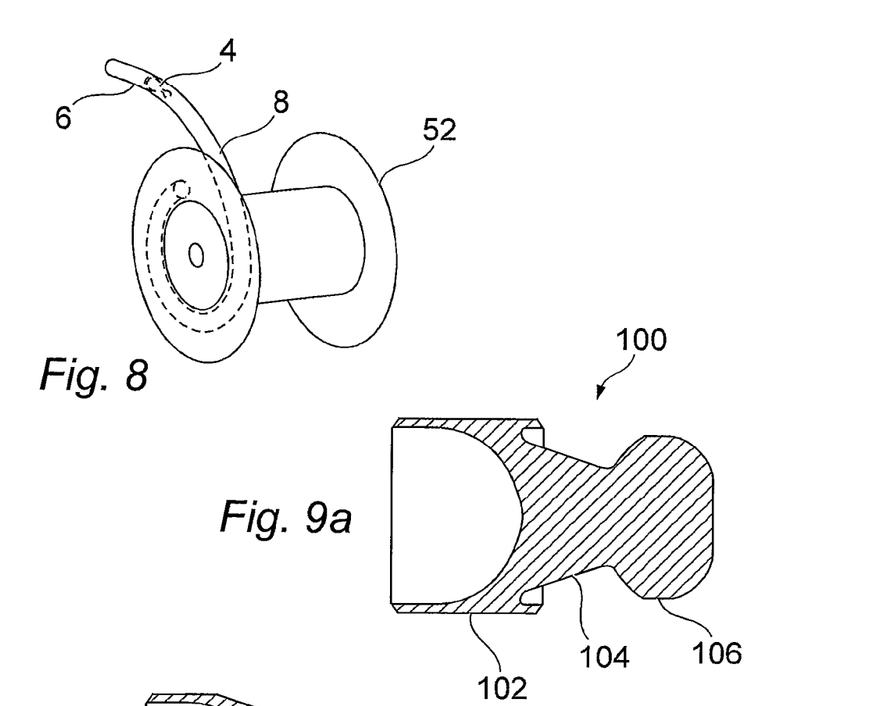
FIG. 8 is a perspective diagrammatic view of reeling a pipeline onto a reel as part of a method of the present invention.
FIGS. 9a and 9b are side cross-sectional views of two different pawn head examples of a first locking member.
Figure 9B:
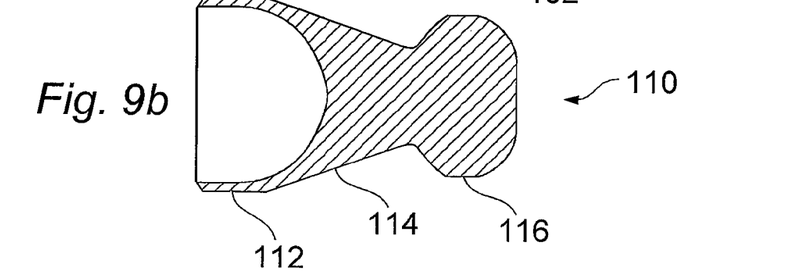
Figure 10:
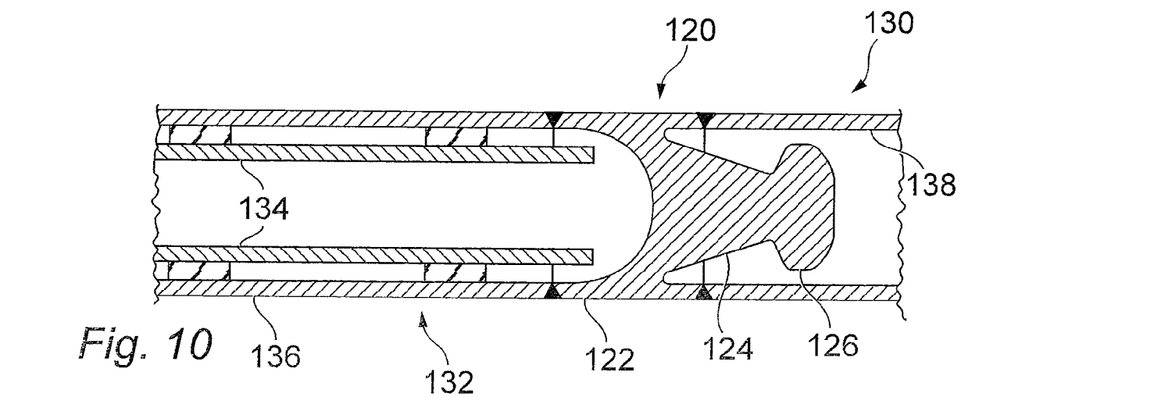
FIG. 10 is a side cross-sectional view of a portion of a pipeline according to another embodiment of the present invention.

FIGS. 9a, 9b and 10 show respectively first, second and third other pawn head shapes 100, 110 and 120 in cross-section, being examples of variations possible and useable in and for the present invention. It can be seen that the pawn head shapes 100, 110 and 120, and also the first locking member 4 shown in FIG. 1, generally comprise a body portion 102, 112, 122, 4a respectively, a thinning or tapering neck portion 104, 114, 124, 4b respectively, followed by an enlarged head portion 106, 116, 126, 4c.

In a preferred embodiment the external diameter of the enlarged head portion is less than the internal diameter of the transition section.

FIGS. 1 and 10 also show the first locking member 4 and third pawn head 120 having a longitudinal axis being the same as the longitudinal axis of the pipeline 2 in FIG. 1 and the pipeline 130 in FIG. 10 respectively, and with the same outer circumference as the pipelines 130, 2 so as to form a continuous and smooth outer circumference between different sections of the pipelines 130, 2 as discussed in more detail hereinafter.

FIG. 1 also shows a possible position labeled A for cutting the pipeline 2 above the first locking member 4 in order to couple the first locking member 4 with a complementary second locking member as described hereinafter, and for a step of a method of laying/abandoning a subsea pipeline from a reel as described hereinafter.

Figure 2A:
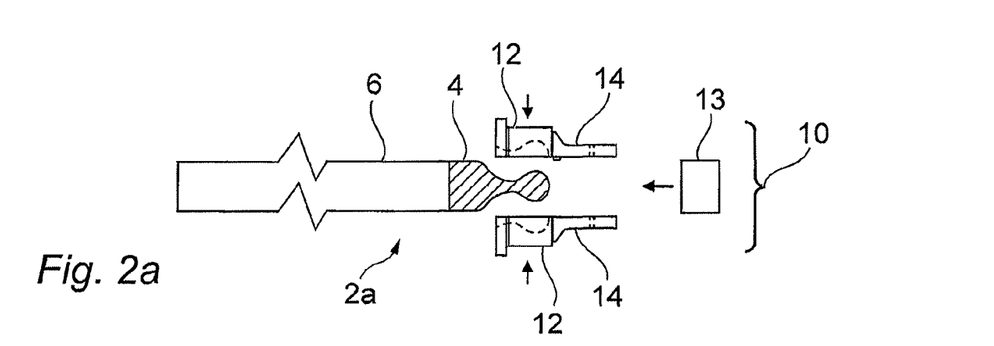
FIGS. 2a and 2b are open and closed schematic views respectively of a reelable pipeline system comprising a reelable pipeline as shown in FIG. 1 after cutting, and a second locking member, according to an embodiment of the present invention.

FIG. 2a shows a cut pipeline 2a, comprising the main body section 6, and the attached first locking member 4, following cutting of the pipeline 2 at position A as shown in FIG. 1, and the removal of any remaining part of the transition portion 8 around the first locking member 4.

Figure 2B:
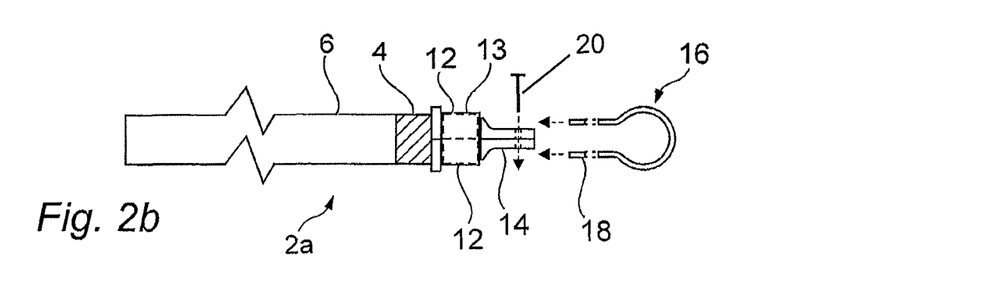

FIG. 2a shows an engagement action of a complementary second locking means 10. The second locking means 10 comprises two half shells 12, each having a head plate 14 extending therefrom. The engagement action comprises the location of the two half shells 12 around the first locking member 4 from opposite directions to form a wholly or substantially body around the first locking member 4 as shown in FIG. 2b. Thereafter a locking sleeve 13 is located around the two half shells. The securing by bolts etc. of the half shells 12 to each other and/or the main body section 6 and/or the locking sleeve 13 is not shown or described in detail.

As shown in FIG. 2b, a locking ring attachment or shackle 16 having flanges 18 can be located outside the plates 14, followed by the securement of the plates 14 and the locking ring 16 together via a suitable locking pin 20 through complementary and now aligned holes or apertures in the plates 14 and flanges 18 in a manner known in the art. Preferably, the locking sleeve 13 and pin 20 are able to secure the half shells 12 together, so as to provide a secure coupling between the second locking means 10 and the first locking means 4, and so transfer the load of the main string section 6 through the first and second locking members 4, 10 to the locking ring 16.

Figure 3:
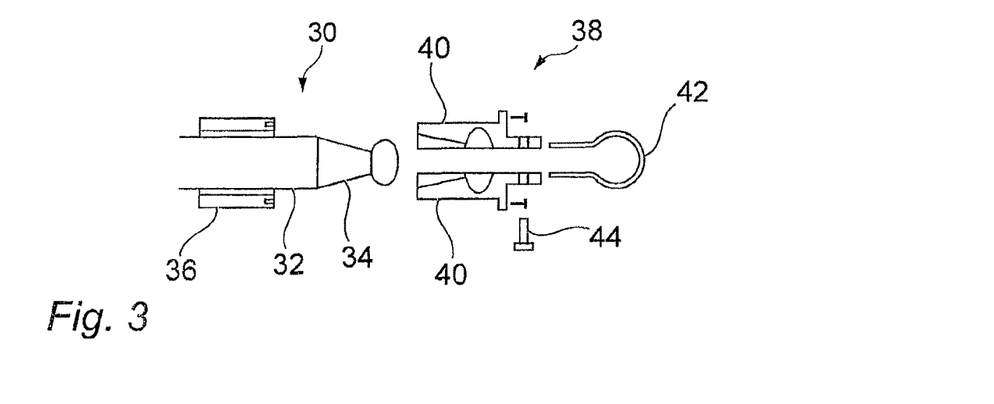
FIG. 3 is a side diagrammatic view of another reelable pipeline system according to the present invention.

FIG. 3 shows parts of another reelable pipeline 30 comprising a main section 32 and an attached pawn head 34. The end of the main section 32 is held within a clamp 36 located on the pipelaying vessel as discussed hereinafter. FIG. 3 also shows a second locking member 38 being similar to the second locking member 10 shown in FIGS. 2a and 2b, comprising two half shells 40, a locking ring 42 and a locking pin 44, in cross-section. The internal shape or shaping of the half shells 40 is complementary to the outer shape of the pawn head 34, such that the half shells 40 can be secured around the pawn head 34 and locked together, in order to provide secure transfer of loading between the main section 32 and the locking ring 42.

A particular feature of the present invention is that the first locking member 4 and the pawn head 34 shown in FIGS. 1 and 3 can be secured to the main section 6, 32 onshore. In this way, the manufacturer of the pipelines 2, 30 can carry out the attachment, generally by welding, of the parts together in a secure and stable environment. This allows for testing of the attachment of the first locking member 4 or pawn head 34 to the main section 6, 32 to be carried out onshore. Thus, any flaws or weaknesses in the attachment can be considered onshore prior to any laying operation, and not in the middle of the pipe-laying operation off shore. The testing can include stress and strain analyses, as well as loading testing, etc. using onshore facilities which are not available or useable off shore.

Furthermore, it also allows the pipeline manufacturer time and consideration for attachment of the first locking member to different types of pipelines, in particular different types of main sections. For example, pipe-in-pipe (PIP) pipelines have particular consideration for maintaining the relationship between the inner and outer pipelines, in particular such that there is not slippage therebetween. Thus, further processing of the attachment of a suitable abandonment head to such pipelines is required, which may lead to additional complications and processing time if carried out during the laying process, when time and money are generally at a premium.

Thus, the present invention allows the pipeline manufacturer to be able to not only attach first locking members onshore, but in particular to test the attachment, including the suitability of certain first locking members to particular pipeline designs, onshore, and not during the critical pipe laying operation where subsequent failure of the abandonment head attachment would be catastrophic.

FIG. 1 also shows the first step in the method of providing and laying/abandoning a subsea pipeline, comprising locating a first locking member in-line in the pipeline.

Figure 4:
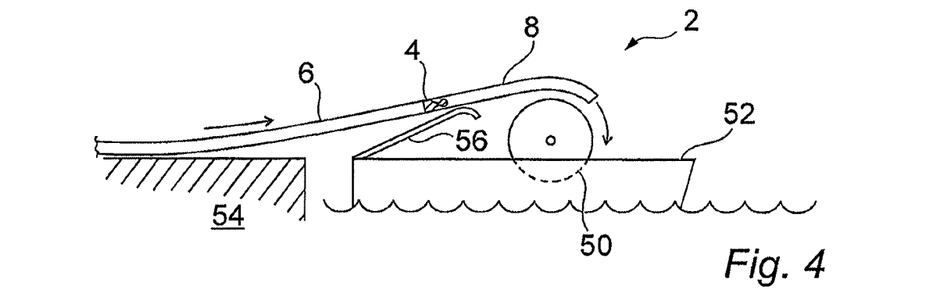
FIG. 4 is a side schematic view of reeling a pipeline of the present invention onto a pipe-laying vessel as part of a method according to another embodiment of the present invention.

FIG. 4 shows a second step of the method comprising the step of reeling a pipeline, such as the pipeline 2 shown in FIG. 1, onto a reel 50 on a pipe-laying vessel 52. In an alternative, the reel 50 is onshore, for locating on a pipe-laying vessel 52 once the pipeline 2 is reeled thereon.

The pipeline 2 is provided from an onshore location 54 and reeled over a laying ramp 56 on the pipe-laying vessel 52.

Following reeling of the reelable pipeline 2 onto the reel 50, the pipe-laying vessel 52 travels to a pipe-laying site for laying of the pipeline 2 under water 59.

Figure 5:
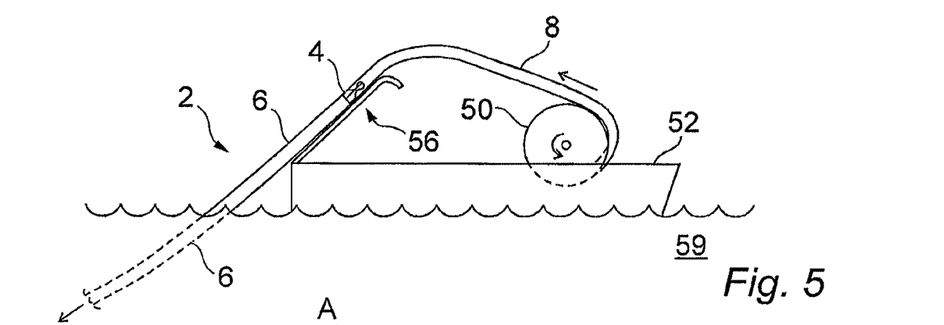
FIG. 5 is a side schematic view of laying the pipeline of FIG. 4 under the water from the reel as part of an embodiment of the method of the present invention.

FIG. 5 shows the pipe-laying vessel 52 in an off-shore location, and the laying of the pipeline 2 partially under the water 59 from the reel 50 and over the laying ramp 56. Typically, the laying ramp 56 is raised during the laying operation. FIG. 5 shows the reeling the main section 6 and first locking member 4 from the reel to a position where the first locking member 4 is then next to or otherwise aligned in the laying ramp 56.

Figure 6:
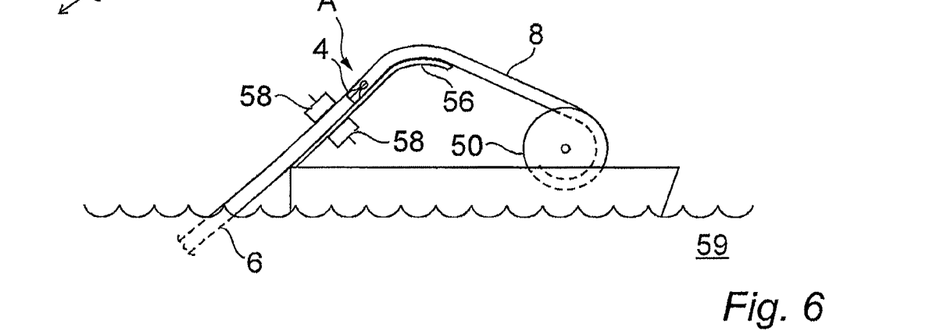
FIG. 6 is a side schematic view of cutting the pipeline above the first locking member as part of an embodiment of the method of the present invention.

FIG. 6 shows the subsequent cutting of the pipeline 2 at position A, and above the first locking member 4. Locking clamps 58 can be applied to the main section 6 in order to clamp the main section 6 to the laying ramp 56 during the cutting operation, and prior to the abandonment operation.

FIGS. 2a and 2b show an example of the coupling of the first locking member 4 with a complementary second locking member 10 as a further step in the method of the present invention being shown. Following the securing of the locking ring 16 to the half shells 12 shown in FIG. 2b, an A&R wire 60 can be coupled to the locking ring 16 in a manner known in the art, such as via one or more shackles.

Figure 7:
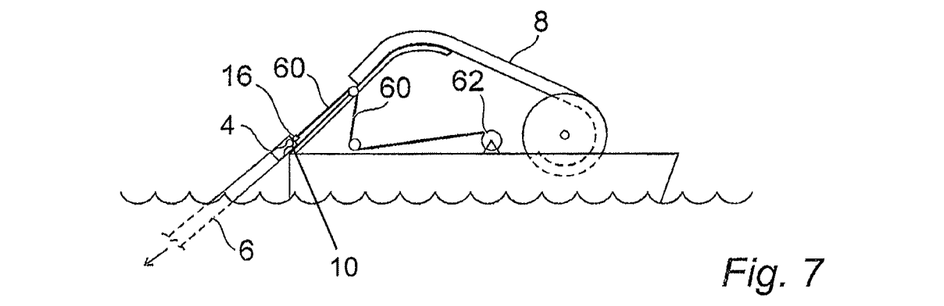
FIG. 7 is a side schematic view of lowering the first and second members under the water as part of a method of the present invention.

FIG. 7 shows the subsequent lowering of the first and second locking members 4, 10 attached to the proximal end of the main pipeline section 6 using the A&R wire 60 from an A&R winch 62.

FIGS. 6 and 7 show the simplicity of the present invention, by having the first locking member 4 already in-line within the pipeline 2, and ready for use in the subsequent pipeline abandonment operation as shown in FIG. 7. In particular, the pipeline layer has assurance of the attachment between the first locking member 4 and the main section 6 of the pipeline 2, which attachment can have been sufficiently prior tested onshore. Also, access to the first locking member 4 is relatively simple by the cutting of the transition section 8, (which could be in this example a lead string section) above the first locking member 4, followed by one or more coupling and securement steps to provide a secure attachment between the first locking member 4 and the A&R wire 60. These operations can be carried out in a relatively simple and fast manner, minimizing the time required to carry out the abandonment of the pipeline under water.

FIG. 8 shows a perspective diagrammatic view of reeling the pipeline 2 onto the reel 52, and in particular shows the continuous and smooth outer circumference between the main section 6 and a transition section 8, such as a lead string section, with the first locking member 4 therein between.

As mentioned hereinabove, the nature and shape of the first locking member is not limited in the present invention, and FIGS. 9a and 9b show first and second respective pawn heads 100, 110 having different shapes in cross-section.

FIG. 10 shows another pipeline 130 comprising a main section 132, being a pipe-in-pipe (PIP) pipeline 132. The PIP pipeline 132 has an inner pipeline 134 and an outer pipeline 136 in a manner known in the art. The second pipeline 130 also has a transition section 138. Between the main section 132 and the transition section 138 is a third pawn head 120 having a main body 122, a tapering neck 124 and an enlarged head 126 as shown. The inner pipeline 134 can be held by friction or more particularly connected via a bulkhead or similar to maintain its location within the outer pipeline 136.

Figure 11:
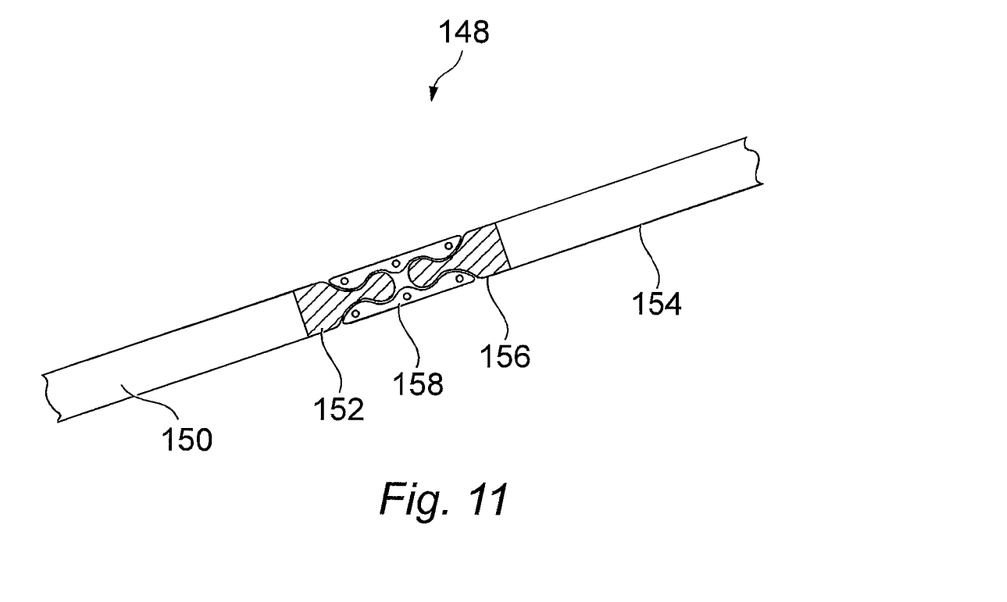
FIG. 11 is a side schematic view of a second reelable pipeline according to another embodiment of the present invention, and for use with a method of the present invention.

FIG. 11 shows a second reelable pipeline 148 for laying under water, comprising a main pipeline section 150, a transition section 154, and an in-line first locking member as a first pawn head 152. The first pawn head 152 is attached to the end of the main pipeline section 150 prior to the transition section 154. A second pawn head 156 is attached in a similar manner to the end of the transition section 154, and an openable clamp or clasp or sleeve 158 is located between and around the first and second pawn heads 152, 156 to couple and secure them together, using bolts or similar, to form the pipeline 148 in a continuous manner that is then able to be reeled onto a reel as described above.

When the majority of the main pipeline section 150 has been laid under water, the clamp 158 can be 'cut' in the sense of uncoupled between and around the first and second pawn heads 152, 156, to leave the first pawn head 152 accessible for coupling with a suitable second locking member (not shown in FIG. 11, but such as those shown and described hereinbefore) to allow the laying operation to continue.

Figure 12:
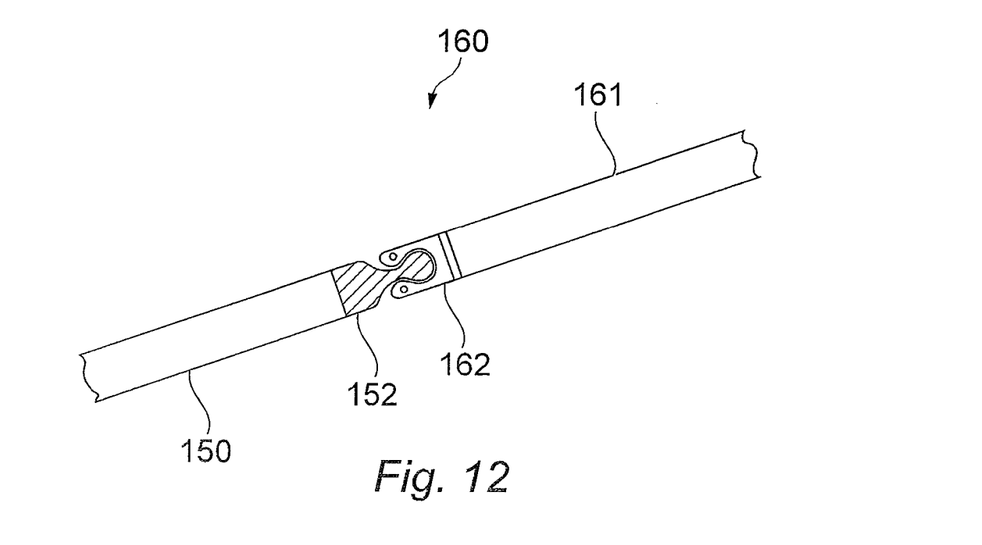
FIG. 12 is a side schematic view of a third reelable pipeline according to another embodiment of the present invention, and for use with a method of the present invention.

Similarly, FIG. 12 shows a third reelable pipeline 160 for laying under water. Like the pipeline 148 in FIG. 11, the pipeline 160 comprises a main pipeline section 150 with a first pawn head 152 as a first locking member attached to the end of the main pipeline section 150, prior to the transition section 161. A second openable clamp 162 is attached in a similar manner to the end of the transition section 161, which can be located around the first pawn head 152 to couple and secure the transition section 161 to the main section 150, using bolts or similar, to form the pipeline 160 in a continuous manner that is then able to be reeled onto a reel as described above.

When the majority of the main pipeline section 150 has been laid under water, the clamp 162 can be 'cut' in the sense of uncoupled from around the first pawn head 152 to make it accessible for coupling with a suitable second locking member (not shown in FIG. 12, but such as those shown and described hereinbefore) to allow the laying operation to continue.

Various modifications and variations to the described embodiments of the invention will be apparent to those skilled in the art without departing from the scope of the invention as defined herein. Although the invention has been described in connection with specific preferred embodiments it should be understood that the invention as defined herein should not be unduly limited to such specific embodiments.

The invention claimed is:

1. A method of laying a subsea pipeline from a reel, the pipeline comprising an attached first in-line locking member, the method comprising, in the following order, at least the steps of:
   (a) laying the pipeline partially under the water from the reel;
   (b) cutting through the pipeline to define a main pipeline section with a first portion under the water, and a second portion above the water that includes the attached first in-line locking member;
   (c) coupling the first in-line locking member that is attached to the main pipeline section with a complementary second locking member; and
   (d) laying the second portion of the main pipeline section below the water by lowering the first in-line locking member and the second locking member under the water.

2. The method as claimed in claim 1 wherein step (d) comprises: attaching an abandonment and recovery (A&R) wire to at least one of the first in-line locking member and the second locking member, and extending the A&R wire to lower the first in-line locking member and the second locking member under the water.

3. The method as claimed in claim 1, wherein the first in-line locking member is a pawn head.

4. The method as claimed in claim 1, wherein the pipeline comprises the main pipeline section and a transition section, and wherein the first in-line locking member is attached to an end of the main pipeline section prior to the transition section.

5. The method as claimed in claim 4 wherein the main pipeline section, transition section, and the first in-line locking member have the same diameter.

* * * * *